US012660046B2

(12) United States Patent
Anderson et al.

(10) Patent No.: US 12,660,046 B2
(45) Date of Patent: Jun. 16, 2026

(54) DUAL MODE ACCESS POINT

(71) Applicant: Cisco Technology, Inc., San Jose, CA (US)

(72) Inventors: Fred J. Anderson, Lakeville, OH (US); John M. Swartz, Lithia, FL (US); Timothy A. Frank, Medina, OH (US)

(73) Assignee: Cisco Technology, Inc., San Jose, CA (US)

( * ) Notice: Subject to any disclaimer, the term of this patent is extended or adjusted under 35 U.S.C. 154(b) by 374 days.

(21) Appl. No.: 18/349,732

(22) Filed: Jul. 10, 2023

(65) Prior Publication Data

US 2024/0365490 A1 Oct. 31, 2024

Related U.S. Application Data

(60) Provisional application No. 63/498,457, filed on Apr. 26, 2023.

(51) Int. Cl.
*H05K 5/02* (2006.01)
*H04W 88/08* (2009.01)

(52) U.S. Cl.
CPC .................................. *H04W 88/08* (2013.01)

(58) Field of Classification Search
CPC ....... H04W 88/08; H05K 5/02; H05K 5/0247; H05K 5/069
See application file for complete search history.

(56) References Cited

U.S. PATENT DOCUMENTS

| | | | |
|---|---|---|---|
| 9,139,097 B2 * | 9/2015 | Chamberlin | .......... B60L 3/0069 |
| 2015/0067755 A1 | 3/2015 | Conroy et al. | |

| | | | | |
|---|---|---|---|---|
| 2015/0207533 A1 | 7/2015 | Ferraro | | |
| 2018/0294982 A1 | 10/2018 | Boemi et al. | | |
| 2021/0058856 A1 | 2/2021 | Qi et al. | | |
| 2022/0329979 A1 * | 10/2022 | Ansley | .................. | H04W 4/029 |
| 2022/0369489 A1 | 11/2022 | Lin | | |

FOREIGN PATENT DOCUMENTS

| | | |
|---|---|---|
| WO | 2010114442 A1 | 10/2010 |
| WO | 2021258379 A1 | 12/2021 |

OTHER PUBLICATIONS

International Search Report and Written Opinion for International Application No. PCT/US2024/024578, mailed Jul. 9, 2024, 12 Pages.
"WatchGuard AP430CR Hardware Guide," WatchGuard: Help Center, Date Access: Jun. 26, 2023, pp. 1-32.
Eve Danel, "An Introduction to Wi-Fi 6E Spectrum in the 6 GHz band—Wi-Fi's First Unlicensed Spectrum Boost in 20 Years," LitePoint, Dated: Oct. 20, 2020, pp. 1-4.

* cited by examiner

*Primary Examiner* — Tuan H Nguyen
(74) *Attorney, Agent, or Firm* — Patterson + Sheridan, LLP

(57) ABSTRACT

The present disclosure describes an access point that can operate in two different modes (e.g., an indoor standard power mode or an outdoor standard power mode). A system includes a device and a panel. The device includes a port and a switch. The panel couples to the device to cover the port such that the panel prevents water from entering the port. The switch actuates when the panel covers the port to cause the device to coordinate with an automated frequency coordination system prior to transmitting.

20 Claims, 4 Drawing Sheets

DUAL MODE ACCESS POINT

CROSS-REFERENCE TO RELATED APPLICATIONS

This application claims benefit of U.S. provisional patent application Ser. No. 63/498,457, filed Apr. 26, 2023. The aforementioned related patent applications are herein incorporated by reference in their entirety.

TECHNICAL FIELD

Embodiments presented in this disclosure generally relate to wireless communications. More specifically, embodiments disclosed herein relate to wireless fidelity (WiFi) communications.

BACKGROUND

Access points may provide access to wireless networks (e.g., WiFi networks) for connected devices. The access points may be positioned indoors or outdoors.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
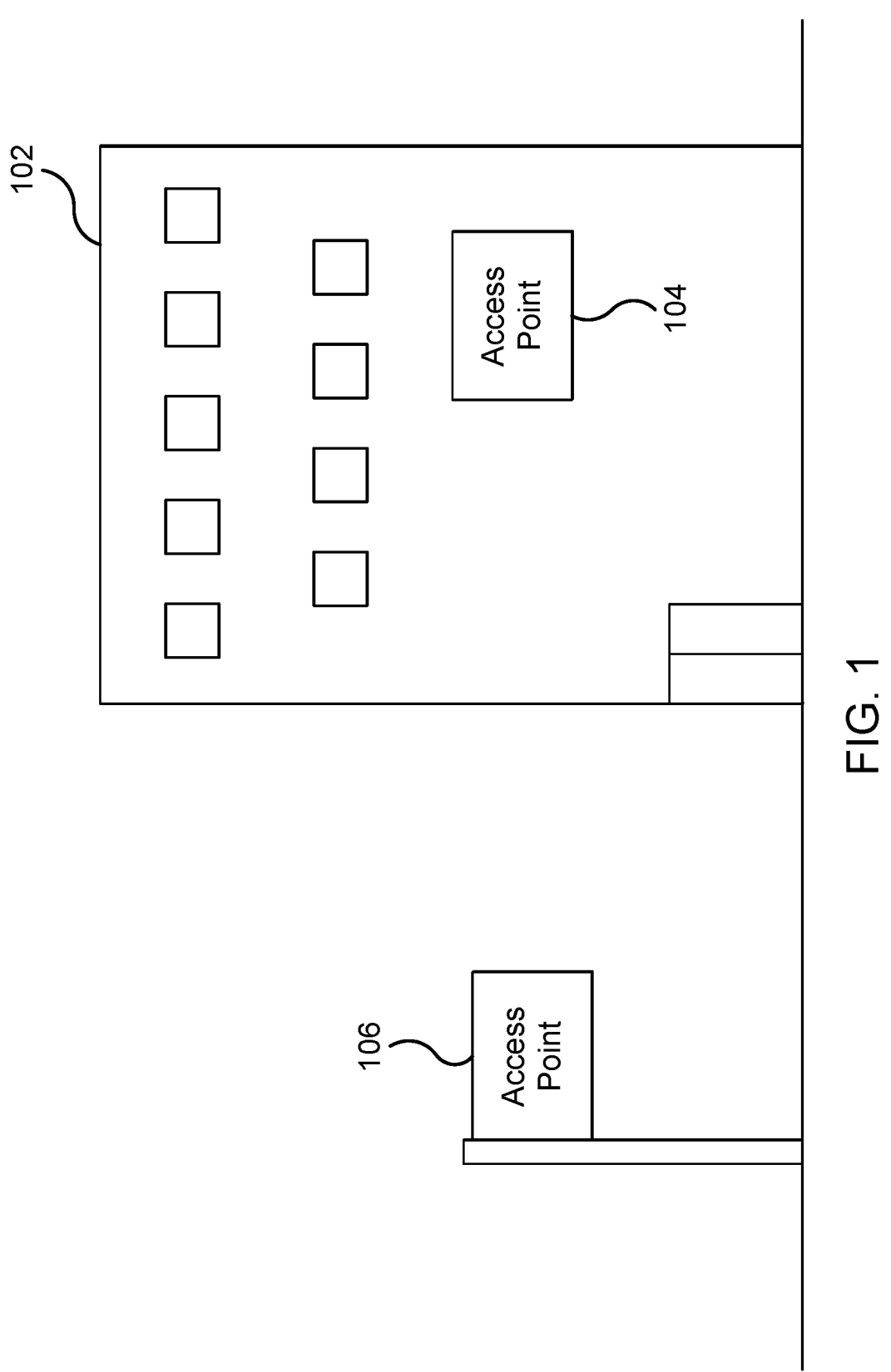
FIG. 1 illustrates an example system.

The present disclosure describes an access point that can operate in two different modes (e.g., an indoor low power mode or an outdoor standard power mode). According to an embodiment, a system includes an access point and a panel. The access point includes a port and a switch. The panel couples to the access point to cover the port such that the panel prevents water from entering the port. The switch actuates when the panel covers the port to cause the access point to coordinate with an automated frequency coordination system prior to transmitting.

According to another embodiment, a method includes detecting, by a processor and based on a switch of an access point being actuated by a panel, that the panel is coupled to the access point to cover a port of the access point such that the panel prevents water from entering the port. The method also includes, in response to detecting that the panel is coupled to the access point, coordinating with an automated frequency coordination system prior to transmitting by the access point.

According to another embodiment, an access point includes a port, a switch, a memory, and a processor communicatively coupled to the memory. The switch actuates when a panel covers the port such that the panel prevents water from entering the port. The processor detects that the switch is actuated by the panel and in response to detecting that the switch is actuated by the panel, coordinates with an automated frequency coordination system prior to transmitting.

EXAMPLE EMBODIMENTS

Access points may provide access to wireless networks (e.g., WiFi networks) for connected devices. In some network deployments, the access points may operate according to different transmission rules depending on whether the access points are positioned indoors or outdoors. For example, an access point may use all 1200 megaHertz (MHz) of the 6 GHz spectrum if the access point is positioned indoors. By contrast, an access point that is positioned outdoors is required to coordinate with an automated frequency coordination (AFC) system that will limit the frequencies that the access point may use so as to not interfere with incumbent devices. The outdoors access point may also be given different channel and/or power allocations compared to the indoors access point. The indoors access point may have the option to coordinate with the AFC system prior to transmitting, but such coordination may not be required.

The indoors access point and outdoors access point may also be subject to different design rules. For example, the outdoors access point may be required to have a weatherized enclosure (e.g., an enclosure that prevents water or moisture from entering the access point). As another example, the indoors access point may not be battery powered and may be required to visibly bear a warning message indicating that indoor use is required. As a result of the different transmission rules and design rules, access points may be designed for only indoor use or only outdoor use, which limits their usability.

The present disclosure describes an access point that may switching between operating indoors or outdoors. The access point may include a port (e.g., to receive a network cable) and a switch. When a weatherproof panel is installed on the access point, the panel may cover the port and actuate the switch, which indicates to the access point that the panel is installed. In response, the access point operates in an outdoor mode (which may be referred to as outdoor standard power mode) in which the access point coordinates with an AFC system prior to transmitting. The AFC system may limit the transmission frequencies, channels, and/or transmission powers that the access point may use. When the panel is removed, the switch is not actuated by the panel, which causes the access point to detect that the panel has been removed. In response, the access point operates in an indoor mode (e.g., which may be referred to as low power indoor (LPI) mode and in which the access point may use all frequencies of the 6 GHz spectrum without coordinating with the AFC system). Additionally, removing the panel may expose a portion of the access point that bears the warning message indicating that indoor use is required.

In certain embodiments, the access point provides several technical advantages. For example, the access point may switch between outdoor and indoor use by installing and removing the weatherproof panel. Thus, the access point is designed for both indoor and outdoor use, in contrast to some existing access points that are designed only for indoor use or only for outdoor use. When the panel is installed on the access point, the access point may be weatherproof and may adhere to the transmission rules that govern outdoor access points (e.g., coordinating with an AFC system prior to transmitting). When the panel is removed from the access point, the access point may adhere to the design rules that govern indoor access points (e.g., not be weatherproof, receive power-over-Ethernet (POE) power, visibly bear a message indicating that indoor use is required).

FIG. 1 illustrates an example system 100. As seen in FIG. 1, the system 100 includes a building 102, an access point 104, and an access point 106. Generally, the access point 104 is installed indoors (e.g., inside the building 102), and the access point 106 is installed outdoors (e.g., outside the building 102). The access point 104 and the access point 106 may follow different transmission rules and design rules as a result of the access point 104 and the access point 106 being installed indoors and outdoors, respectively.

The access point 104 may be installed inside the building 102, and may follow the transmission rules and design rules for indoor access points. For example, the access point 104 may transmit using all 1200 MHz of the 6 GHz spectrum without coordinating with an AFC system. The assumption is that the walls of the building 102 will cause enough loss in transmitted signals that the access point 104 does not interfere with incumbent devices located outside the building 102. Additionally, the access point 104 may not have a weatherproof housing or enclosure, and the access point 104 may not be battery powered. Instead, the access point 104 may receive electrical power using PoE. Furthermore, the access point 104 may visibly bear a message indicating that indoor usage is required.

By contrast, the access point 106 may be installed outdoors (e.g., outside the building 102), and may follow the transmission rules and design rules for outdoor access points. For example, the access point 106 may coordinate with the AFC system prior to transmitting. The AFC system may limit the transmission frequencies, transmission powers, and/or channel allocations that the access point 106 may use to transmit signals and messages. The access point 106 may adhere to the instructions from the AFC system so that the access point 106 does not interfere with incumbent devices. Additionally, the access point 106 may have a weatherproof housing or enclosure (e.g., so that rainwater and moisture do not enter the access point 106 and damage the access point 106).

Figure 2:
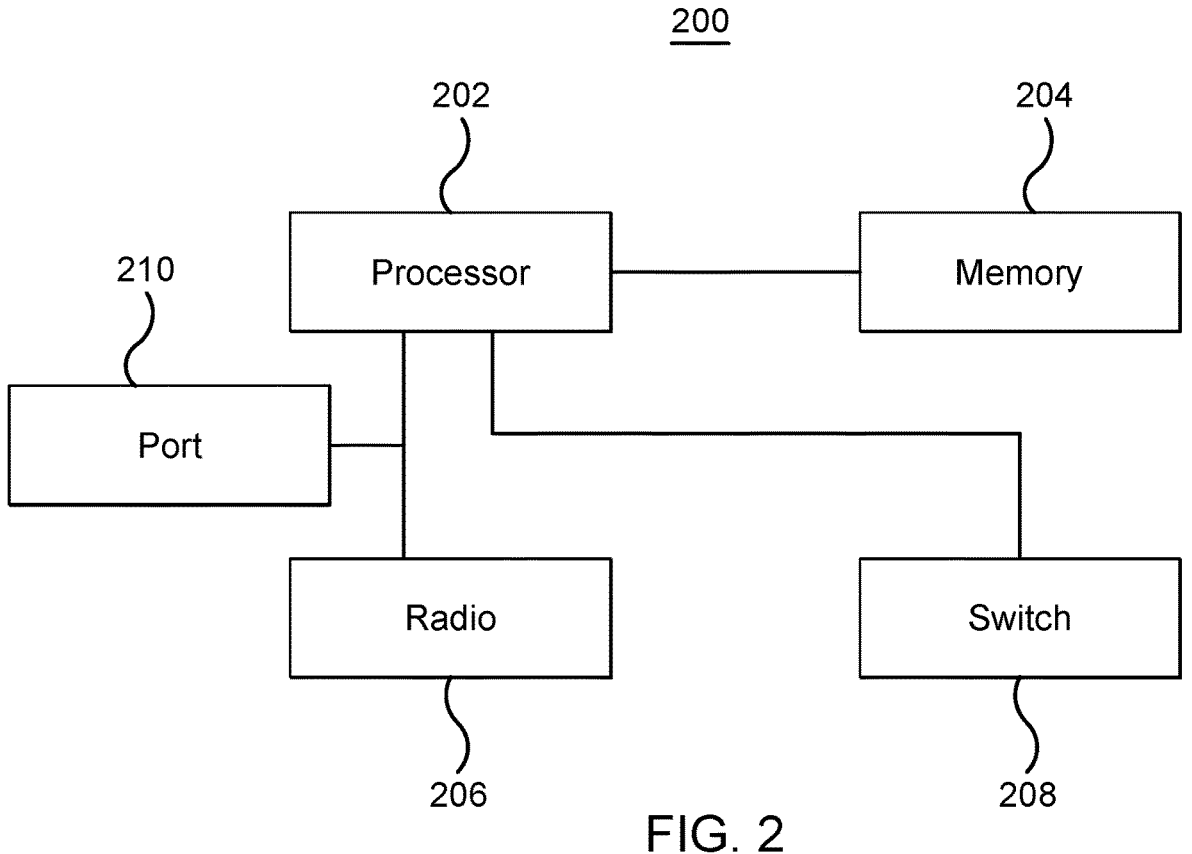
FIG. 2 illustrates an example access point that may be used in the system of FIG. 1.

FIG. 2 illustrates an example access point 200 that may be used in the system 100 of FIG. 1. Generally, the access point 200 may be a device that wirelessly transmits or receives signals or messages from user devices in a network. The access point 200 may switch between operating in an indoor mode and an outdoor mode. As seen in FIG. 2, the access point 200 includes a processor 202, a memory 204, a radio 206, a switch 208, and a port 210. The processor 202 and the memory 204 may perform the actions or functions of the access point 200 described herein.

The processor 202 is any electronic circuitry, including, but not limited to one or a combination of microprocessors, microcontrollers, application specific integrated circuits (ASIC), application specific instruction set processor (ASIP), and/or state machines, that communicatively couples to memory 204 and controls the operation of the access point 200. The processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 202 may include other hardware that operates software to control and process information. The processor 202 executes software stored on the memory 204 to perform any of the functions described herein. The processor 202 controls the operation and administration of the access point 200 by processing information (e.g., information received from the other devices, a network, and the memory 204). The processor 202 is not limited to a single processing device and may encompass multiple processing devices.

The memory 204 may store, either permanently or temporarily, data, operational software, or other information for the processor 202. The memory 204 may include any one or a combination of volatile or non-volatile local or remote devices suitable for storing information. For example, the memory 204 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 204, a disk, a CD, or a flash drive. In particular embodiments, the software may include an application executable by the processor 202 to perform one or more of the functions described herein.

The access point 200 may include one or more radios 206. A radio 206 may include circuitry and antennas used to transmit and receive signals and messages. For example, the radio 206 may transmit signals and messages to user devices (e.g., phones, laptops, computers, tablets, etc.) or receive signals and messages from the user devices.

The switch 208 may actuate to transition the access point 200 between operating in the indoor mode and the outdoor mode. For example, the switch 208 may be a magnetic switch that actuates when a magnet is brought near the switch 208. As another example, the switch 208 may be an electrical switch that actuates when an electrical contact is brought near to the switch 208 or contacts the switch 208. As another example, the switch 208 may be a mechanical switch that actuates when an object physically contacts the switch 208.

When the switch 208 is not actuated, the access point 200 may operate in an indoor mode. For example, the access point 200 may use all 1200 MHz of the 6 GHz spectrum without coordinating with an AFC system. When the switch 208 is actuated, the access point 200 may operate in an outdoor mode. For example, the access point 200 may coordinate with the AFC system prior to transmitting. The access point 200 may send information (e.g., location information) to the AFC system. The AFC system may determine, using the location information, whether the access point 200 will interfere with any incumbent devices. The AFC system may then limit the transmission frequencies, transmission powers, and/or channel allocations of the access point 200 so that the access point 200 does not interfere with the incumbent devices.

The port 210 may receive a cable (e.g., an Ethernet cable) that carries information to and from the access point 200. For example, the access point 200 may wirelessly receive information from a user device using a radio 206. The access point 200 may then communicate that information through a cable connected to the port 210. As another example, the access point 200 may receive information over a cable connected to the port 210. The access point 200 may then wirelessly communicate that information to a user device using a radio 206.

A panel may be attached to the access point 200 to transition the access point 200 from operating in the indoor mode to operating in the outdoor mode. The panel may be a weatherproof panel (e.g., that prevents rainwater, moisture, dust, or debris from entering the access point 200). When the panel is attached to the access point 200, the panel may actuate the switch 208. For example, if the switch 208 is a magnetic switch, the panel may include a magnet that actuates the switch 208. If the switch 208 is an electrical switch, the panel may include an electrical contact that actuates the switch 208. If the switch 208 is a mechanical switch, the panel may physically contact the switch and actuate the switch.

The processor 202 may detect when the switch is actuated and change the operation of the access point 200 accordingly. For example, when the processor 202 detects that the switch 208 is actuated, the processor 202 may transition the access point 200 to operating in the outdoor mode. The processor 202 may begin coordinating with the AFC system so that the access point 200 does not interfere with incumbent devices. When the processor 202 detects that the switch 208 is not actuated, the processor 202 may transition the access point 200 to operating in the indoor mode. For example, the processor 202 may cause the access point 200 to use all 1200 MHz of the 6 GHz spectrum without coordinating with the AFC system.

In this manner, the access point 200 may serve as either the access point 104 or the access point 106 in the system 100 of FIG. 1. Specifically, when the panel is not installed on the access point 200, the switch 208 is not actuated and the access point 200 may operate in the indoor mode. As a result, the access point 200 may be installed indoors like the access point 104. When the panel is installed on the access point 200, the switch 208 is actuated and the access point 200 may operate in the outdoor mode. As a result, the access point 200 may be installed outdoors like the access point 106. The access point 200 may also be installed indoors but continue to operate in the outdoor mode.

Figure 3:
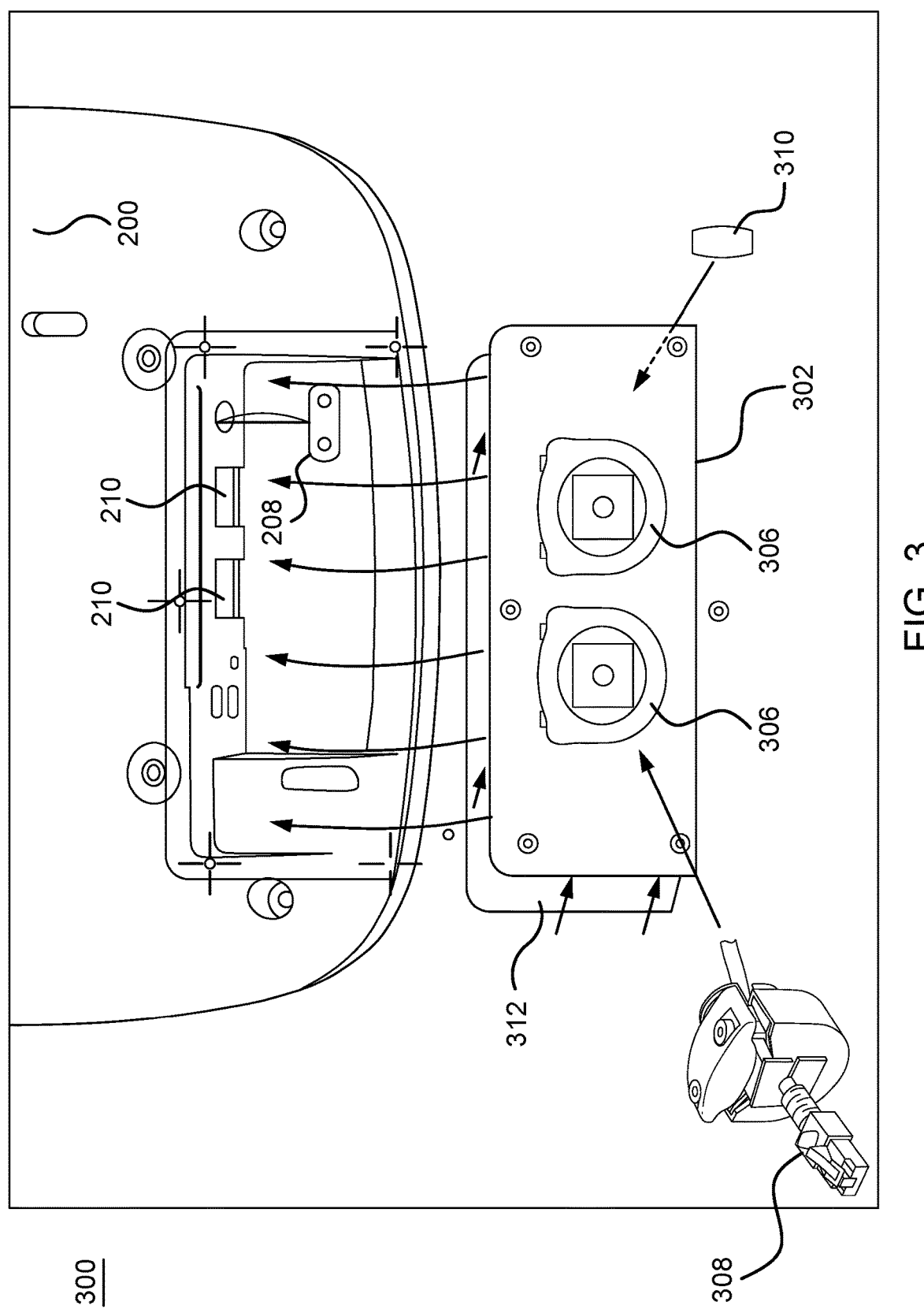
FIG. 3 illustrates an example access point that may be used in the system of FIG. 1.

FIG. 3 illustrates an example system 300. As seen in FIG. 3, the system 300 includes the access point 200 and a panel 302. Generally, the panel 302 may attach to the access point 200 to weatherproof the access point 200. The panel 302 may be detached from the access point 200 so that the access point 200 is non-weatherproof. As a result, a user may configure the access point 200 to be either weatherproof or non-weatherproof. When the panel 302 is attached to the access point 200, the access point 200 may operate in the outdoor mode. When the panel is not attached to the access point 200, the access point 200 may operate in the indoor mode.

As seen in FIG. 3, the access point 200 may include one or more ports 210 and the switch 208. The ports 210 may allow wires or cables to connect directly to the access point 200. For example, Ethernet cables may connect to the access point 200 through the ports 210. These cables may provide a network connection to the access point 200 as well as electrical power (e.g., using power over Ethernet).

The switch 208 may actuate to indicate that the access point 200 is weatherproof (e.g., rainwater may not enter the access point 200). For example, when the panel 302 is attached to the access point 200, the switch 208 may actuate to indicate to the access point 200 that the panel 302 is attached and that the access point 200 is weatherproof. The access point 200 may then be allowed to operate in the indoor mode. The switch 208 may be any suitable switch. For example, the switch 208 may include a magnetic switch that actuates when a magnet on the panel 302 is brought near the magnetic switch. As another example, the switch 208 may include a mechanical switch that is physically actuated by the panel 302 when the panel 302 is attached to the access point 200. As another example, the switch 208 may include an electrical switch that is actuated when electrical contacts on the panel 302 are brought near the electrical switch.

The panel 302 may be a cover that attaches to the access point 200. For example, the panel 302 may engage the access point 200 (e.g., via tabs or slots) and may be secured to the access point 200 using screws or another fastener. When the panel 302 is attached to the access point 200, the panel 302 may cover the ports 210 so that the ports 210 are weatherproof (e.g., the panel 302 may prevent rain or other debris from entering the ports 210). When the panel 302 is removed from the access point 200, the access point 200 may be considered non-weatherproof.

As seen in FIG. 3, the panel 302 includes connectors 306 (e.g., split gland connectors) that allow a cable 308 (e.g., an Ethernet cable) to pass through the panel 302 and to the ports 210. These connectors 306 may allow the cable 308 to pass through the connectors 306 without destroying the weatherproof seal formed by the panel 302. As a result, the connectors 306 allow the cable 308 to pass from the outside of the access point 200, through the panel 302, and to the port 210.

The panel 302 also includes an object 310 on a side of the panel 302 facing the switch 208. The object 310 may be a magnet, an electrical contact, or another structure that may physically contact the switch 208. When the panel 302 is attached to the access point 200, the object 310 may actuate the switch 208 to indicate to the access point 200 that the panel 302 is attached to the access point 200 and that the access point 200 is weatherproof.

In some embodiments, a chip or radio frequency identification (RFID) tag is attached to the panel 302 (e.g., to the side of the panel 302 facing the switch 208 when the panel 302 is installed). The chip or RFID tag may transmit a code that is received by the access point 200 (e.g., by another chip in the access point 200 or by the processor 202 of the access point 200). The code may identify or authenticate the panel 302 to the access point 200. The access point 200 may verify the code to confirm that the proper panel 302 is attached to the access point 200. If the access point 200 cannot or does not verify the code, then the access point 200 may not switch to operating in the outdoor mode. For example, the access point 200 may assume that an improper panel is installed or some improper mechanism is being used to actuate the switch 208. In this manner, the chip or RFID tag provides additional assurance that the access point 200 is used properly. Additionally, the access point 200 may protect against counterfeit panels or against custom products/techniques intended to trick or defeat the switch 208. In certain embodiments, the switch 208 may be designed to use radio frequency coupling. For example, the object 310 may be the chip or RFID tag that transmits a code that is received by and that actuates the switch 208. When the switch 208 is actuated, the access point 200 may operate in the outdoor standard power mode. When the incorrect code is transmitted (e.g., by a counterfeit panel), the switch 208 may not actuate. Thus, the panel 302 may use magnetic coupling, electrical coupling, radio frequency coupling, or physical coupling to actuate the switch 208.

The panel 302 also includes a gasket 312 positioned on a surface of the panel 302 facing the access point 200. The gasket 312 may contact the access point 200 and form a weatherproof seal around the ports 210 of the access point 200. For example, the gasket 312 may prevent rain from seeping through the sides of the panel 302 and into the access point 200.

In some embodiments, the access point 200 bears a message (e.g., next to the switch 208) indicating that indoor use is required. When the panel 302 is installed, the panel 302 may cover the message so that the message is not visible. When the panel 302 is removed, the message may be uncovered and visible again. In this manner, the access point 200 complies with certain design rules governing indoor access points when the panel 302 is removed.

The access point 200 includes a user-configurable enclosure whereby the basic enclosure is non-weatherproof due to exposed I/O connectors (e.g., ports 210), but may be made weatherproof by the addition of the supplied panel 302 with appropriate seals (e.g., the gasket 312) and connectors 306 (e.g., cable glands). The access point 200 may normally comply with non-weatherproof/indoor device type categorization (e.g., design rules governing indoor access points) without the panel 302, and therefore, the access point 200 is eligible for 6 GHz LPI operation. Installation of the weatherproof panel 302 actuates an internal sensor or switch 208, which indicates to the access point 200 that LPI operation is not available and that standard power operation is then solely allowed (including AFC requirements). Security in the form of authentication/anti-counterfeiting may also be added to the access point 200 or the panel 302, if desired.

By providing a simple and robust weatherproofing interlock using the panel 302, the system 100 will also offer unique adaptivity to other regulatory challenges centered around indoor and outdoor operation, such as spectrum availability. There are many countries and regions where outdoor channel availability is restricted, as are certain equivalent isotropically radiated power (EIRP) levels. The interlock system may ensure that appropriate restrictions are enforced in outdoor applications, easing the regulator's concerns about indoor/outdoor duality.

The access point 200 may also obey the 15.407 restriction of 21 dBm EIRP at 30 degrees above the horizon for outdoor usage in the UNII1, 5, and 7 bands, while enabling full standard power levels in indoor applications.

As a result, regulatory requirements are met with either the panel 302 on or off, because the access point 200 may modify its behavior according to the application of the panel 302. For example, when the panel 302 is removed, the access point 200 may operate in an indoor mode in which the access point 200 may use all 1200 MHz of the 6 GHz spectrum. When the panel 302 is installed, the panel 302 may actuate the switch 208, which causes the access point 200 to operate in an outdoor mode or standard power mode. The access point 200 may coordinate with an AFC system before the access point 200 transmits. The AFC system may limit the transmission frequencies, transmission powers, or channel allocations of the access point 200 so as to not interfere with incumbent devices. The access point 200 may continue to operate in the standard power mode as long as the panel 302 is installed. Thus, even if the access point 200 is positioned indoors, the access point 200 may still operate in the standard power mode if the panel 302 is installed. In some embodiments, no user intervention may alter thus mode-changing behavior, and thus, the access point 200 may receive certifications for both indoor and outdoor usage.

Figure 4:
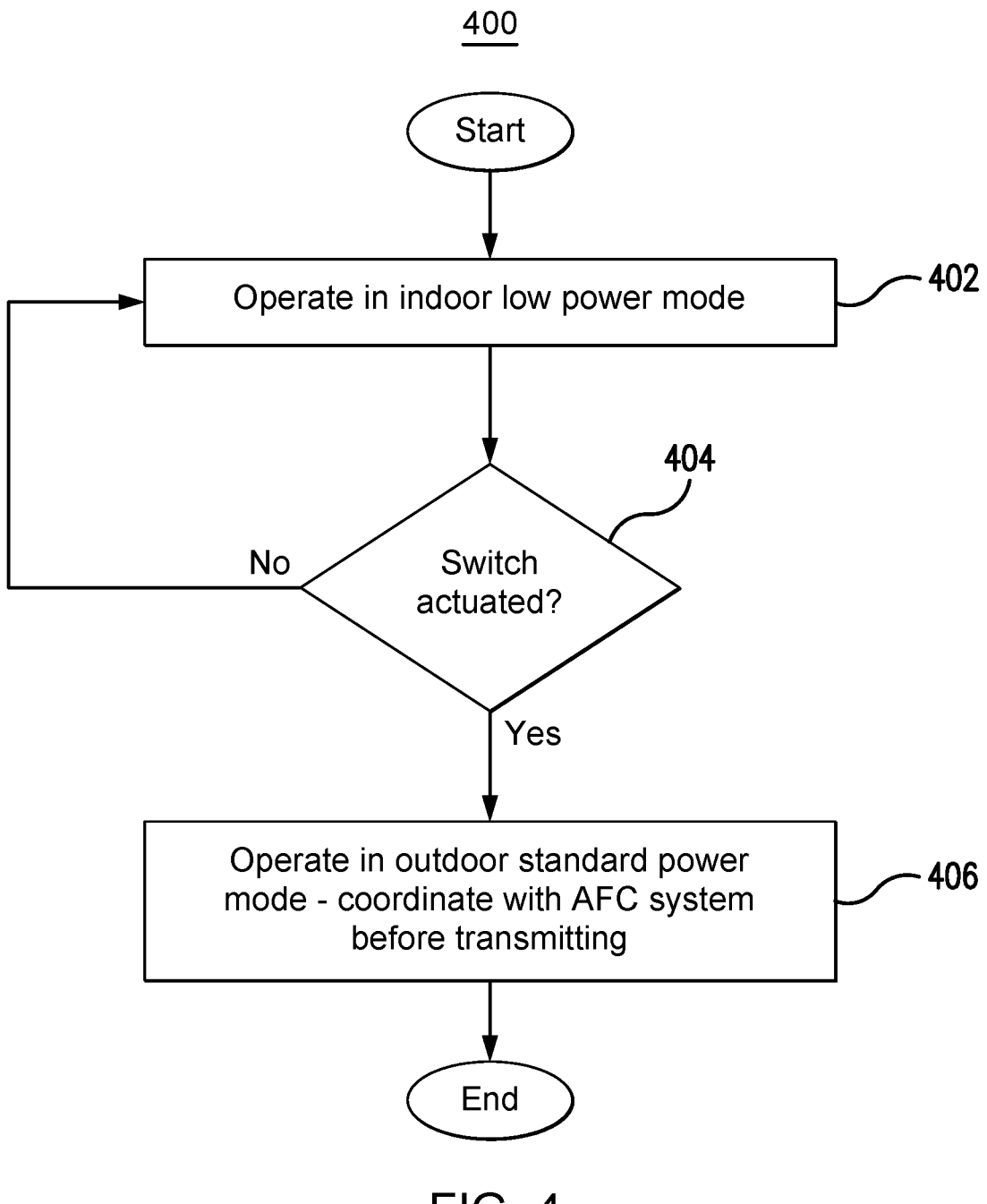
FIG. 4 is a flowchart of an example method.

FIG. 4 is a flowchart of an example method 400. In particular embodiments, the access point 200 performs the method 400. By performing the method 400, the access point 200 may transition between operating in the indoor mode and the outdoor mode.

In block 402, the access point 200 operates in the LPI mode. The access point 200 may be installed indoors and may use all 1200 MHz of the 6 GHz spectrum without coordinating with an AFC system. The panel 302 may not be installed on the access point 200, and so the switch 208 may not be actuated. The access point 200 may detect that the switch 208 is not actuated and operate in the LPI mode.

In block 404, the access point 200 determines whether the switch 208 is actuated. For example, if the panel 302 is installed on the access point 200, the panel 302 may actuate the switch 208. If the panel 302 is not installed on the access point 200, the switch 208 may not be actuated. If the access point 200 determines that the switch 208 is not actuated, the access point 200 may continue operating in the LPI mode in block 402.

If the access point 200 determines that the switch 208 is actuated, the access point 200 may continue to block 406 to operate in the outdoor standard power mode. In this mode, the access point 200 may coordinate with the AFC system before transmitting. For example, the access point 200 may communicate location information to the AFC system, and the AFC system may use that location information to determine whether the access point 200 will interfere with any incumbent devices. The AFC system may then instruct the access point 200 to limit its transmission frequencies, transmission powers, and/or channel allocations so that the access point 200 does not interfere with the incumbent devices.

The switch 208 may actuate using any suitable mechanism. For example, the switch 208 may be a magnetic switch that actuates when a magnet on the panel 302 is brought near the switch 208. As another example, the switch 208 may be an electrical switch that actuates when an electrical contact on the panel 302 is brought near or contacts the switch 208. As another example, the switch 208 may be a mechanical switch that actuates when the panel 302 physically contacts the switch 208. As yet another example, the switch 208 may also use radio frequency coupling. For example, the panel 302 may include a chip or RFID tag that transmits a code that is received by the switch 208. The code may identify or authenticate the panel 302 and actuate the switch 208. The switch 208 may include or may be an RFID reader or radio frequency reader that can detect the transmitted code. The RFID reader or radio frequency reader may actuate the switch 208 upon detecting the correct code. If the switch 208 is the RFID reader or radio frequency reader, then the RFID reader or radio frequency reader may "actuate" by indicating to the access point 200 (e.g., indicating to the processor 202) that the panel 302 is properly installed.

In summary, the access point 200 may switch between operating indoors or outdoors. The access point 200 may include a port 210 (e.g., to receive a network cable) and a switch 208. When a weatherproof panel 302 is installed on the access point 200, the panel 302 may cover the port 210 and actuate the switch 208, which indicates to the access point 200 that the panel 302 is installed. In response, the access point 200 operates in an outdoor mode in which the access point 200 coordinates with an AFC system prior to transmitting. The AFC system may limit the transmission frequencies, channels, and/or transmission powers that the access point 200 may use. When the panel 302 is removed, the switch 208 is not actuated by the panel 302, which causes the access point 200 to detect that the panel 302 has been removed. In response, the access point 200 operates in an indoor mode in which the access point 200 may use all frequencies of the 6 GHz spectrum without coordinating with the AFC system. Additionally, removing the panel 302 may expose a portion of the access point 200 that bears the warning message indicating that indoor use is required.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:
1. A system comprising:
a wireless access point comprising a port and a switch; and
a panel arranged to couple to the wireless access point to cover the port such that the panel prevents water from entering the port, wherein the switch is arranged to actuate when the panel covers the port to cause the wireless access point to coordinate at least one of transmission power or transmission frequency with an automated frequency coordination system prior to transmitting.

2. The system of claim 1, wherein a magnet is positioned on the panel and wherein the magnet causes the switch to actuate when the panel covers the port.

3. The system of claim 1, wherein an electrical contact is positioned on the panel and wherein the electrical contact causes the switch to actuate when the panel covers the port.

4. The system of claim 1, wherein the panel comprises a gland connector arranged to pass a cable through the panel and to the port.

5. The system of claim 1, wherein the panel comprises a gasket arranged on the panel, wherein the gasket prevents rain from entering the port.

6. The system of claim 1, further comprising screws arranged to secure the panel to the wireless access point.

7. The system of claim 1, wherein the panel is arranged to uncouple from the wireless access point so that the port is uncovered to cause the wireless access point to transmit without coordinating with the automated frequency coordination system.

8. The system of claim 1, further comprising a chip or a radio frequency identification (RFID) tag coupled to the panel, wherein the chip or RFID tag is configured to transmit a code when the panel is coupled to the wireless access point, wherein the code causes the wireless access point to coordinate with the automated frequency coordination system prior to transmitting.

9. A method comprising:

detecting, by a processor and based on a switch of a wireless access point being actuated by a panel, that the panel is coupled to the wireless access point to cover a port of the wireless access point such that the panel prevents water from entering the port; and in response to detecting that the panel is coupled to the wireless access point, coordinating at least one of transmission power or transmission frequency with an automated frequency coordination system prior to transmitting by the wireless access point.

10. The method of claim 9, wherein a magnet is positioned on the panel and wherein the magnet causes the switch to actuate when the panel covers the port.

11. The method of claim 9, wherein an electrical contact is positioned on the panel and wherein the electrical contact causes the switch to actuate when the panel covers the port.

12. The method of claim 9, wherein the panel comprises a gland connector arranged to pass a cable through the panel and to the port.

13. The method of claim 9, wherein the panel comprises a gasket arranged on the panel, wherein the gasket prevents rain from entering the port.

14. The method of claim 9, further comprising screws arranged to secure the panel to the wireless access point.

15. The method of claim 9, further comprising:

detecting, by the processor and based on the switch, that the panel is uncoupled from the wireless access point so that the port is uncovered; and in response to detecting that the panel is uncoupled from the wireless access point, transmitting without coordinating with the automated frequency coordination system.

16. The method of claim 9, wherein detecting that the panel is coupled to the wireless access point comprises receiving a code transmitted by a chip or a radio frequency identification (RFID) tag coupled to the panel.

17. A wireless access point comprising:

a port;

a switch arranged to actuate when a panel covers the port such that the panel prevents water from entering the port;

a memory; and a processor communicatively coupled to the memory, the processor configured to:

detect that the switch is actuated by the panel; and in response to detecting that the switch is actuated by the panel, coordinate at least one of transmission power or transmission frequency with an automated frequency coordination system prior to transmitting.

18. The wireless access point of claim 17, wherein a magnet is positioned on the panel and wherein the magnet causes the switch to actuate when the panel covers the port.

19. The wireless access point of claim 17, wherein an electrical contact is positioned on the panel and wherein the electrical contact causes the switch to actuate when the panel covers the port.

20. The wireless access point of claim 17, wherein the panel comprises a gland connector arranged to pass a cable through the panel and to the port.

* * * * *